United States Patent Office 2,956,611
Patented Oct. 18, 1960

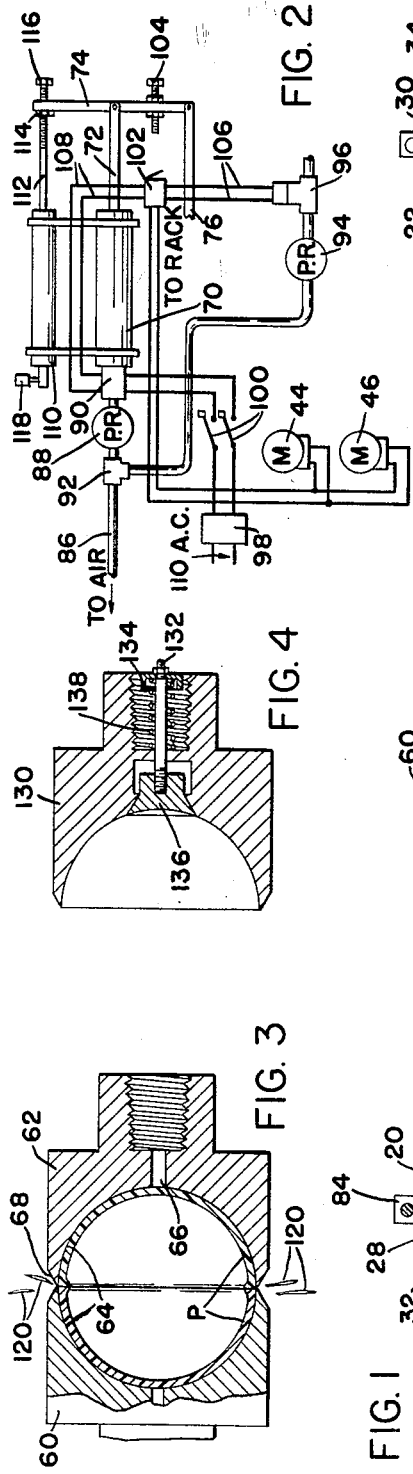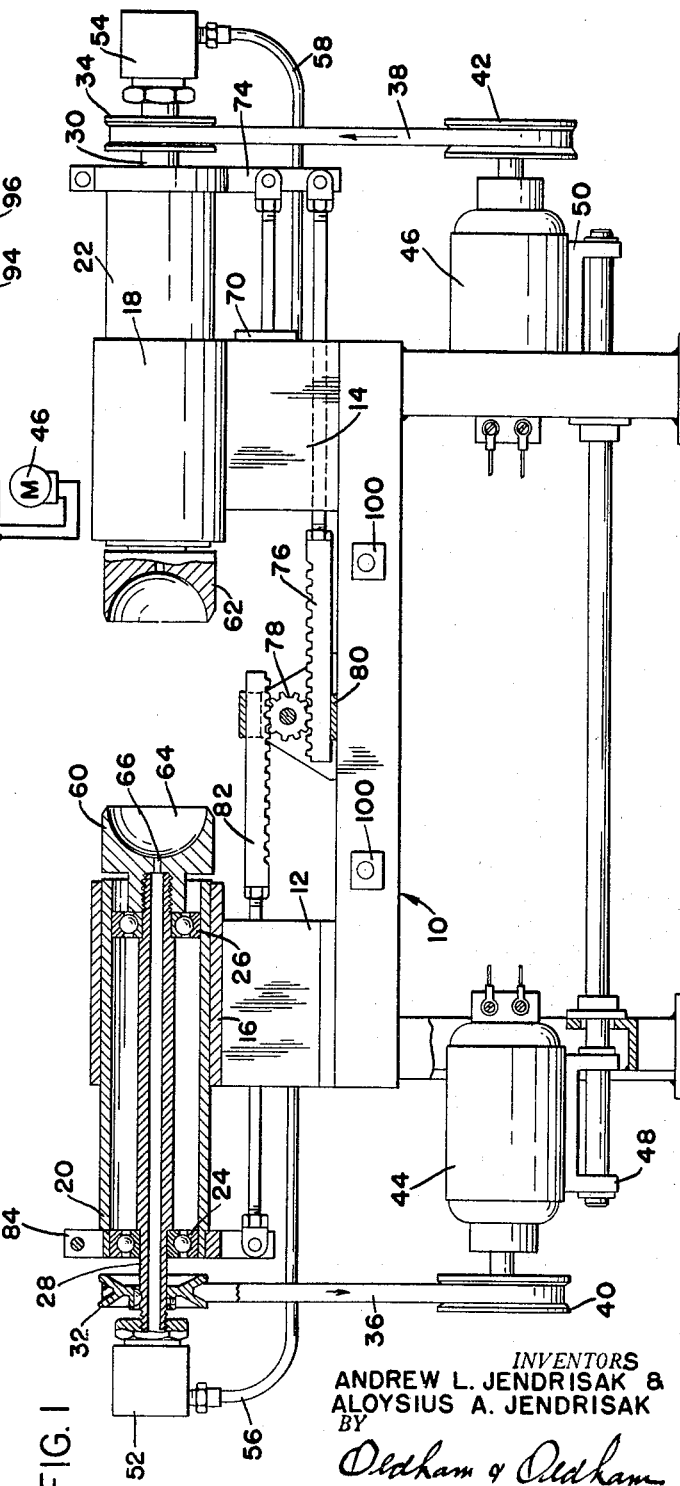

2,956,611

METHOD AND APPARATUS FOR JOINING TOGETHER HOLLOW PLASTIC BALL HALVES

Andrew L. Jendrisak, Cuyahoga Falls, and Aloysius A. Jendrisak, Akron, Ohio, assignors to The Brittain Products Company, Cuyahoga Falls, Ohio Filed Jan. 7, 1957, Ser. No. 632,705

4 Claims. (Cl. 154—1)

This invention relates to method and apparatus for joining together hollow plastic ball halves and similar objects.

Hollow plastic ball halves made of polyethylene have been difficult to join together for the reason that suitable cements are not available to hold the halves firmly together over the life of the ball. Often the ball is subjected to relatively severe blows in use, for example, perforated hollow-shell golf practice balls, hollow plastic practice baseballs, and the like. Efforts to mold the balls as a single piece have met with little success.

It is the general object of our invention to provide relatively simple apparatus and methods for quickly, inexpensively, and permanently assembling plastic ball parts, or the like, together into an integrally fused structure having little or no flash and characterized by excellent balance and long-life.

Another object of our invention is the provision of an improved method for fusing plastic parts together by rotating the parts in opposite direction while held in joining position.

Another object of our invention is to provide methods and apparatus wherein plastic parts are melted together with frictionally generated heat, and wherein centrifugal force is utilized to help hold the parts in position during the joining operation, and is used to assist in removing any flash in the area of joinder. The foregoing objects of our invention and other objects which will become apparent as the description proceeds, are achieved by rotating the ball parts in opposite directions while holding the parts substantially in position to be joined, pressing the parts towards each other as the material softens and immediately stopping the rotation between the joined parts. Substantially concurrent with the pressing of the softened edges of the parts together any flash which is formed in the area of joinder is trimmed.

In terms of apparatus, the invention includes a pair of axially aligned, opposed chucks each adapted to receive a ball part, such as a ball half, means for rapidly moving the chucks towards each other until the ball halves are substantially in engagement and for then slowly moving the chucks towards each other to press the ball halves against each other as their edges soften under frictional heat, means for rotating the chucks in opposite directions, means carried by the chucks for trimming the flash from the joined edges of the ball halves, adjustable means for reversing movement of the chuck moving means to effect movement of the chucks rapidly apart, means operative substantially concurrently with said adjustable means for releasing the ball halves from the chucks, means for stopping the chuck moving means when the chucks have been moved apart, and a pair of switches which must be simultaneously held down, one by each hand of the operator for initiating the operation of the chuck moving means.

For a better understanding of our invention, reference should be had to the accompanying drawings wherein Fig. 1 is a front elevation, partially in section, of one embodiment of apparatus incorporating the principles of our invention;

Fig. 2 is a schematic wiring and piping diagram of the apparatus illustrated in Fig. 1;

Fig. 3 is an enlarged front elevation, partially in diametric section, of the manner in which the chucks cooperate in the joining of hollow plastic ball halves together; and Fig. 4 is a view of a modified form of chuck incorporating mechanical push-out means, this chuck being shown in longitudinal section.

In the drawings, the numeral 10 indicates generally a frame or table having aligned saddles 12 and 14 positioned at opposite ends of the table. The saddles 12 and 14 have secured thereto housings 16 and 18 which support for aligned sliding movement toward and from each other quills 20 and 22. Anti-friction bearings of the ball or roller type are normally utilized to slidably support the quills 20 and 22 in the housing 16 and 18, but for purposes of simplification, these bearings have not been shown in the drawings.

Each of quills 20 and 22 rotatably supports in anti-friction bearings 24 and 26 a hollow spindle 28 and 30, respectively, these spindles being adapted to rotate in opposite directions. This is conveniently achieved by mounting pulleys 32 and 34 on the ends of the spindles which pulleys receive V-belts 36 and 38 extending over pulleys 40 and 42 carried on the driving shafts of electric motors 44 and 46. The motors 44 and 46 are mounted on tilting platforms 48 and 50 on the table 10 so that, in accord with conventional practice, the weight of the motors assist in keeping the belts 36 and 38 tight. In addition, the yielding of the motors, together with the relatively long stretches of belts 36 and 38 allows for movement of the spindles 28 and 30 toward and from each other, in the manner hereinafter described, even though the pulleys 32 and 34 are fixed to the spindles.

Air under pressure is adapted to be periodically supplied to the hollow spindles 28 and 30, and this is conveniently accomplished by means of a ball swivel connection 52 secured to spindle 28 and a ball swivel connection 54 on spindle 30, flexible hoses 56 and 58 extending from the respective ball swivels to a source of air pressure, as will be more fully explained in conjunction with the description of Fig. 2.

Each spindle 28 and 30 mounts a chuck, these being indicated respectively by numerals 60 and 62, the connection between each spindle and its chuck being conveniently made threaded of the same pitch and diameter as a standard lathe chuck. In joining hollow plastic ball halves each of chucks 60 and 62 is provided with a hemispherical recess 64 of just slightly smaller size than the ball half to be carried so that there is a frictional engagement between the ball half and chuck when the ball half is pressed into the chuck by the operator's hand. The bottom of the recess 64 is provided with an axial aperture 66 in alignment with the bore of the spindle 28. The edge of each chuck is tapered to a relatively sharp point 68 (see Fig. 3), this relatively sharp edge functioning in a flash trimming capacity in a manner to be hereinafter described.

In order to move the chucks 60 and 62 toward and from each other an air motor 70 is mounted on the table. This motor has a piston rod 72 secured to a crosshead 74 in turn secured to quill 22 to thereby move the quill, the spindle 30 rotatably carried therein and the chuck 62 mounted on the spindle. To transmit the movements of the crosshead 74 equally to the quill 20, the crosshead is connected to a slidably mounted rack carried on the table 10 which drives an idler gear 78 carried in brackets 80 on the table top, and the idler gear 78 in turn drives a rack 82 slidably extending through saddle 12 and connected to yoke 84 clamped on the end of quill 20.

Turning now to the schematic diagram of Fig. 2, an air pressure line 86 extends through a pressure regulator 88 to an electrically controlled reverse valve 90 on an air motor 70, and by way of a T connection 92 through a pressure regulator 94 to a solenoid operated valve 96 which connects to flexible conduits 56 and 58 extending to spindles 28 and 30. The apparatus is adapted to be electrically operated from 110 volts alternating current which is adapted to be connected through an on-off switch 98 through a pair of push-button safety operating switches 100 to the valve 90 to throw it in the direction so that the air motor 70 is operated to move the chucks 60 and 62 towards each other. The safety switches 100 are mounted on the table 10 in such a manner that both hands of the operator are required to simultaneously engage the switches in order to throw valve 90 in the direction to start air motor 70 into operation. It will be understood that once valve 90 is thrown in the direction to start the air motor 70 that it will stay in this position even though safety switches 100 are closed merely for an instant.

On-off switch 98 starts drive motors 44 and 46 in accord with the electrical connection shown, and electric current is also supplied to limit switch 102 mounted on the table 10 in the path of movement of the crosshead 74. When the limit switch 102 is closed, by engagement of screw 104 adjustably mounted on the crosshead 74, electric current is supplied by way of connections 106 to solenoid valve 96 to give a shot or blast of compressed air to each of the chucks 60 and 62. Simultaneously the closing of limit switch 102 reverses valve 90, by way of electrical connections 108 to reverse the direction of operation of air motor 70 and to return the chucks to the position shown in Fig. 1.

Speed control cylinder 110 fastened to air motor 70, and having a piston rod 112 fastened in a lost motion manner to crosshead 74 by means of adjustable nuts 114 and 116 makes it possible to vary the speed of the stroke of air motor 70, the speed control cylinder 110 containing oil and an adjustable orifice valve controlled by adjusting knob 118. The speed control cylinder 110 associated with an air motor 70 is available on the commercial market, and this combination per se forms no part of our invention except insofar as the combination thereof in the manner described allows the stroke of air motor 70 to be relatively rapid as the chucks are brought from the position shown in Fig. 1 almost up to the point where the ball halves carried in the chucks are in engagement with each other. Then the stroke of the air motor slows down so that the movement of the ball halves together is relatively slow. The return movement of the air motor to separate the chucks is again relatively rapid.

It is believed that the operation of our improved apparatus will be understood from the foregoing description. Suffice it to say here that in the operation of the apparatus the switch 98 is turned to on position and air is supplied to conduit 86. Thereafter, the operator places a ball half, identified by the letter P in Fig. 3 in each of the chucks 60 and 62 and then places his hands on safety operating switches 100. This throws valve 90 to supply air to motor 70 to move the chuck 60 and 62 towards each other with a relatively rapid motion. As the ball halves are brought substantially into engagement, the movement together of the chucks slow down to bring the edges of the ball halves into frictional engagement, the chucks 60 and 62 rotating in opposite direction. Continued rotary movement generates sufficient frictional heat in the ball halves P to melt these engaging edges or faces and fuse or seal them together. During this operation, the chucks 60 and 62 continue to move slowly towards each other extruding a flash of the softened material. However, the relatively sharp edges 68 of the chucks cut or snub off this flash with pieces 120 thereof being shown in Fig. 3. In this action, the centrifugal force of the oppositely rotating chucks 60 and 62 assist in throwing off these pieces of flash to give a very smooth outer periphery to the line joinder. The edges 68 of the chucks 60 and 62 never quite meet, but are brought to within .001 to .004″ of each other. This limit of movement of the chucks towards each other is set by the adjustable screw 104 carried on the crosshead 74, and so that when this screw engages and operates the limit switch 102, the direction of movement of the air motor 70 is reversed. Simultaneously solenoid valve 96 is operated to give a blast of compressed air to the chucks to discharge the ball parts from the chucks. The blast or jet of compressed air supplied to the chucks not only frees the ball halves from the chuck but also gives a final pressure squeeze to the ball parts and, in effect, compacts the weld joining the ball parts.

It will be understood that the pressure regulator 88 and the regulator 94 are adjusted together with the time of operation of the limit switch 102 so that best possible fusion of the parts together is achieved. It will also be noted that the rotary movement of the chucks assists in holding the ball parts in position in the chucks by centrifugal force as the edges of the parts are frictionally rotated against each other. Movement of both chucks towards each other facilitates automatic loading of the chucks, if this be desired.

The modified form of chuck shown in Fig. 4 of the drawing utilizes a mechanical push out finger for discharging a ball or other part from the chuck once the fusion operation is completed. It will be understood that it is important that as soon as the fusing is completed that the parts joined are immediately released from their respective chucks. In the form of the invention heretofore described, this has been accomplished by means of the air. However, in the chuck of Fig. 4, identified as a whole by the numeral 130, a push rod 132 is slidably received in an axial bore of the chuck. At one end of the rod is fixedly secured a piston 134 which slidably is received in the bore of the spindle, and secured to the other end of rod 132 is a head 136, fitting with a valve seat action in the recess of the chuck, and held on this seat by compression spring 138 carried between the piston 134 and the chuck in the manner shown. In this form of the invention when a blast of air is supplied through solenoid valve 96 to the respective spindles, the blast of air engages with piston 134 to move push rod 132 and head 136 outwardly of the chuck recess against the action of compression spring 138 to substantially instantly release the grip of the chuck on the plastic part and to discharge it from the chuck. This type of chuck is employed, for example, in making practice golf balls of plastic which are normally made from hollow-perforated plastic halves.

It will be recognized from the foregoing that the various objects of our invention have been achieved by the provision of relatively inexpensive, easily operated apparatus for rapidly joining plastic parts together. The term "plastic" as employed in the specification and claims is intended to include thermoplastic and thermosetting plastics including rubber and rubber-like materials.

While in accord with the patent statutes certain best known embodiments of our invention have been illustrated and described in detail, it is to be particularly understood that we are not to be limited thereto, but that the scope of our invention is defined in the appended claims.

We claim:

1. That method of joining together thermoplastic hollow ball halves which includes the steps of supporting the outer surfaces of the ball halves up to and just short of the marginal edges of the ball halves by cupped chuck members having tapered sharp edges, rotating the supported ball halves in opposite directions with the edges of the ball halves to be joined engaging each other and until the edges are brought to fusion temperature, continuously pressing the ball halves towards each other to form a flash in the area of joinder, said pressing being continued until the sharp edges of the chuck members are just short of contact with each other to thereby effect a trimming of the flash from the area of joinder of the ball halves, thereafter stopping the relative rotation between the chuck members, moving the chuck members apart, and removing the completed ball.

2. That method of joining together thermoplastic hollow ball halves which includes the steps of supporting the outer surfaces of the ball halves by cupped chuck members, rotating the supported ball halves in opposite directions with the edges of the ball halves to be joined engaging each other and until the edges are brought to fusion temperature, continuously pressing the ball halves towards each other to unite the edges of the ball halves together, thereafter stopping the relative rotation between the chuck members, moving the chuck members apart, and removing the completed ball.

3. Apparatus for joining together plastic ball halves including a pair of axially-aligned, opposed chucks each adapted to receive a ball half and to support it substantially adjacent a margin thereof about its outer surface, means for rapidly moving the chucks towards each other until the ball halves are substantially in engagement and for then slowly moving the chucks towards each other to press the edges of the ball halves into engagement against each other, means for rotating the chucks in opposite directions to generate sufficient frictional heat to melt the engaging edges of the ball halves and fuse them together, means including cooperating trimming edges carried by the chucks for trimming the flash formed at the fused together edges of the ball halves when the chucks are moved toward one another to press the ball halves together, adjustable means for reversing movement of the chuck moving means to effect movement of the chucks rapidly apart, means operative substantially concurrent with said adjustable means for releasing the ball halves from the chucks, means for stopping the rotation of the chuck moving means when the chucks have been moved apart, and means for initiating the operation of the chuck moving means.

4. Apparatus for joining together plastic ball halves including a pair of axially-aligned, opposed chucks each adapted to receive a ball half and to support it substantially adjacent a margin thereof about its outer surface, means for moving the chucks towards each other to bring the edges of the ball halves into engagement with each other, means for rotating the chucks in opposite directions to generate sufficient frictional heat to melt the engaging edges of the ball halves and fuse them together, means including cooperating trimming edges on said chucks for trimming the flash produced at the fused together edges of the ball halves, adjustable means for reversing movement of the chuck moving means to effect movement of the chucks apart, means operative substantially concurrent with said adjustable means for releasing the ball halves from the chucks, means for stopping the chuck moving means when the chucks have been moved apart, and means for initiating the operation of the chuck moving means.

References Cited in the file of this patent

UNITED STATES PATENTS

| 444,721 | Bevington | Jan. 13 1891 |
| 2,169,315 | Yngve | Aug. 15, 1939 |
| 2,319,683 | Hoffman | May 18, 1943 |
| 2,565,036 | Macdonald | Aug. 21, 1951 |
| 2,597,704 | Carlson | May 20, 1952 |
| 2,721,600 | Perryman | Oct. 25, 1955 |
| 2,755,840 | Bartley | July 24, 1956 |
| 2,779,998 | Bailey | Feb. 5, 1957 |
| 2,853,118 | Schnitzius | Sept. 23, 1958 |

FOREIGN PATENTS

| 572,789 | Great Britain | Oct. 24, 1945 |

OTHER REFERENCES

Mod. Plastics, "Fabricating with Frictional Heat," November 1945, pp. 142–145.

Plastics, "Fabrication by Friction," December 1945, pp. 64, 66, 67 and 113–115.